US009770694B2

(12) United States Patent
Psilander (10) Patent No.: US 9,770,694 B2
(45) Date of Patent: Sep. 26, 2017

(54) MIXING DEVICE CARBONATOR APPLIANCE COMPRISING A CARBONATOR AND METHOD OF PRODUCING A CARBONATED BEVERAGE

(75) Inventor: Andreas Psilander, Stockholm (SE)

(73) Assignee: Electrolux Home Products Corporation N.V., Brussels (BE)

( * ) Notice: Subject to any disclaimer, the term of this patent is extended or adjusted under 35 U.S.C. 154(b) by 357 days.

(21) Appl. No.: 14/354,687

(22) PCT Filed: Nov. 11, 2011

(86) PCT No.: PCT/EP2011/069961
§ 371 (c)(1),
(2), (4) Date: Aug. 1, 2014

(87) PCT Pub. No.: WO2013/068049
PCT Pub. Date: May 16, 2013

(65) Prior Publication Data
US 2014/0342071 A1    Nov. 20, 2014

(51) Int. Cl.
*B01F 3/04* (2006.01)
*B01F 5/06* (2006.01)
(Continued)

(52) U.S. Cl.
CPC ............... *B01F 3/04* (2013.01); *A23L 2/54* (2013.01); *B01F 3/04503* (2013.01);
(Continued)

(58) Field of Classification Search
CPC .... B01F 3/04; B01F 3/04787; B01F 3/04503; B01F 3/04985; B01F 5/04; B01F 5/06;
(Continued)

(56) References Cited

U.S. PATENT DOCUMENTS

| 935,698 A | * | 10/1909 | Silberschmidt | ........ | A45D 27/10 |
| | | | | | 127/12 |
| 1,945,489 A | | 1/1934 | Manley | | |

(Continued)

FOREIGN PATENT DOCUMENTS

| AT | 333111 | | 11/1976 |
| CN | 101037263 | * | 9/2007 |

(Continued)

OTHER PUBLICATIONS

English Translation for DE29608289 published Aug. 1996.*
(Continued)

*Primary Examiner* — Anthony Weier
(74) *Attorney, Agent, or Firm* — Pearne & Gordon LLP (57) ABSTRACT

There is provided a mixing device (2) for a beverage and CO2 gas for producing carbonated beverage. The mixing device (2) having a mixing channel (4) extending in a main direction (10). The mixing channel (4) includes: wide channel sections (16) and narrow channel sections (18) along the main direction (10). The mixing channel (4) has an elongated cross section seen in a direction perpendicular to the main direction (10). At least a first delimiting surface (22) of the mixing channel (4) is provided with protrusions (20) extending at least partially along the first delimiting surface (22) in a direction across the mixing channel (4) and protruding towards a second delimiting surface (24) of the mixing channel (4) to form the narrow channel sections (18). A turbulent flow of beverage is created by the narrow and wide channel sections. Further a carbonator for producing carbonated beverage, an appliance having a carbonator, and a method of producing a carbonated beverage are provided.

29 Claims, 5 Drawing Sheets

(51) Int. Cl.
*A23L 2/54* (2006.01)
*B01F 11/02* (2006.01)
*B01F 5/04* (2006.01)
B01F 15/00 (2006.01)
B01F 3/20 (2006.01)
B01F 5/00 (2006.01)

(52) U.S. Cl.
CPC ...... *B01F 3/04787* (2013.01); *B01F 3/04808* (2013.01); *B01F 3/04815* (2013.01); *B01F 3/04985* (2013.01); *B01F 5/04* (2013.01); *B01F 5/0473* (2013.01); *B01F 5/06* (2013.01); *B01F 5/067* (2013.01); *B01F 5/0615* (2013.01); *B01F 5/0651* (2013.01); *B01F 5/0676* (2013.01); *B01F 5/0688* (2013.01); *B01F 11/0208* (2013.01); *B01F 3/2014* (2013.01); *B01F 15/00253* (2013.01); *B01F 2003/049* (2013.01); *B01F 2005/0022* (2013.01)

(58) Field of Classification Search
CPC .... B01F 5/0615; B01F 5/0641; B01F 5/0688; B01F 11/0208; B01F 5/0473; B01F 5/067; B01F 5/0676; B01F 15/002253; B01F 3/04808; B01F 3/04815; B01F 3/2014; B01F 2003/049; B01F 2005/0022; A23L 2/54
See application file for complete search history.

(56) References Cited

U.S. PATENT DOCUMENTS

| | | | | |
|---|---|---|---|---|
| 2,229,441 A | | 1/1941 | Carlson | |
| 2,348,791 A | * | 5/1944 | Di Pietro | B01F 3/04808 165/132 |
| 2,549,311 A | * | 4/1951 | Hudson | B01F 3/04815 137/411 |
| 2,633,343 A | * | 3/1953 | Aghnides | E03C 1/084 210/449 |
| 3,761,066 A | * | 9/1973 | Wheeler | B01F 5/0682 222/129 |
| 4,087,862 A | * | 5/1978 | Tsien | B01F 5/0057 366/165.1 |
| RE32,179 E | * | 6/1986 | Sedam | B67D 1/0021 261/121.1 |
| 4,859,376 A | * | 8/1989 | Hancock | B01F 3/04241 261/140.1 |
| 5,842,600 A | | 12/1998 | Singleterry | |
| 6,213,633 B1 | | 4/2001 | Kramer et al. | |
| 6,655,829 B1 | * | 12/2003 | Vanden Bussche | B01F 5/04 366/165.1 |
| 8,109,415 B2 | * | 2/2012 | Tu | B05B 7/0037 222/145.5 |
| 2003/0164328 A1 | * | 9/2003 | Arnaud | B01D 21/2433 210/512.1 |
| 2003/0168754 A1 | * | 9/2003 | Spiegel | A23L 2/54 261/94 |
| 2009/0261485 A1 | * | 10/2009 | Eklund | B01F 3/04808 261/22 |
| 2011/0268845 A1 | * | 11/2011 | Fantappie | A23L 2/54 426/67 |

FOREIGN PATENT DOCUMENTS

| | | | |
|---|---|---|---|
| DE | 29608289 | | 8/1996 |
| EP | 1537907 | | 6/2005 |
| EP | 1974802 | | 10/2008 |
| GB | 606497 | * | 8/1948 |
| GB | 2347093 | * | 8/2000 |

OTHER PUBLICATIONS

English Translation for CN101037263 published Sep. 2007.*
International Search Report for PCT/US2011/069961, dated Jul. 24, 2012, 3 pages.

* cited by examiner

MIXING DEVICE CARBONATOR APPLIANCE COMPRISING A CARBONATOR AND METHOD OF PRODUCING A CARBONATED BEVERAGE

TECHNICAL FIELD

The present invention relates to a mixing device for a non-carbonated beverage and $CO_2$ gas for producing carbonated beverage, to a carbonator for mixing a non-carbonated beverage with $CO_2$ gas for producing carbonated beverage, to an appliance comprising a carbonator, and to a method of producing a carbonated beverage in a carbonator by mixing a non-carbonated beverage with $CO_2$ gas.

BACKGROUND

Carbon dioxide, $CO_2$ gas, is mixed with beverage, such as water or flavoured water, to produce a carbonated beverage. The $CO_2$ gas dissolves at least partially in the water and forms carbonic acid, $H_2CO_3$. The $CO_2$ is weakly soluble in water, therefore it separates back into $CO_2$ gas, which form the bubbles consumers associate with carbonated beverages.

$CO_2$ gas may be mixed into water in different ways utilizing two physical principles, mixing under high pressure or mixing over a long period of time or a combination thereof. Water pressure and water temperature affect the solubility of $CO_2$ gas in water. Cold water will dissolve more $CO_2$ than warm water.

For in-line carbonation, i.e. when flowing beverage is to be carbonated, both pressure and time is limited. Furthermore, water temperature may vary, e.g. during different times of the year. Water pressure may also vary. If not properly adjusted for current operating conditions, an in-line carbonator may easily provide either badly carbonated beverage or a stream of $CO_2$ gas with occasional slugs of beverage. It is thus a challenge to produce an in-line carbonator which will provide carbonated beverage under different operating conditions.

EP 2070587 discloses a beverage dispenser provided with an in-line beverage carbonation system. The beverage dispenser comprises a liquid beverage supply line fluidly connected to a water source, a gas supply line fluidly connected to a pressurized gas source, and at least one mixing device for mixing the gas with the liquid beverage. At least one inlet port is fluidly connecting the gas supply line to the liquid beverage supply line, or to the mixing device, for introducing the gas into the liquid beverage. Liquid beverage mixed with gas is dispensed at a dispenser point.

U.S. Pat. No. 5,510,060 discloses an in-line carbonator comprising a casing defining an elongated chamber having a helical groove in an inner wall and an elongated inner body disposed in the chamber. The elongated inner body and the helical groove define a helical flow passage. At one end of the helical channel, liquid to be carbonated is supplied to the helical flow passage, and at the other end of the helical flow passage carbonated liquid exits the helical passage. The elongated inner body is formed of a micro-porous material. $CO_2$ gas which carbonates the liquid diffuses via the micro-porous material into the liquid in the helical passage from an inner gas chamber of the inner body. In case of a pressure drop on the $CO_2$ gas side or increase of pressure on the liquid side, liquid will penetrate into the micro-porous material. The micro pores will hold the liquid and it may be difficult under ordinary operating conditions to remove the liquid from all the micro pores. The operation conditions of the carbonator are negatively influenced when micro pores are filled with liquid.

IT PZ20080002 (A1) filed 2008 May 16 discloses an in-line mixing arrangement for liquid and gas. The arrangement comprises a tube with an inner diameter varying N-fold between at least two different inner diameters. In practice the arrangement does not provide a satisfying solution for in-line carbonation of a beverage.

Thus, there still exists a need for an in-line carbonator which at least is subjected to less of the problems associated with the known in-line carbonators.

SUMMARY

An object is to provide an alternative arrangement and/or method used for carbonating a beverage and which in some aspects provide an improvement over known devices.

According to an aspect, the object is achieved by a mixing device for a beverage and $CO_2$ gas for producing carbonated beverage. The mixing device comprises a mixing channel, an inlet to the mixing channel and an outlet for carbonated beverage from the mixing channel. The mixing channel extends in a main direction, along which main direction the beverage is adapted to flow. The mixing channel comprises wide channel sections and narrow channel sections along the main direction. The mixing channel has an elongated cross section seen in a direction perpendicular to the main direction. At least a first delimiting surface of the mixing channel is provided with protrusions extending at least partially along the first delimiting surface in a direction across the mixing channel and protruding towards a second delimiting surface of the mixing channel to form the narrow channel sections.

Since the mixing channel has an elongated cross section and the narrow channel sections are formed by the protrusions extending at least partially along the first delimiting surface, the beverage is subjected to turbulent flow through the mixing channel. The turbulent flow is upheld by the beverage passing in the main direction over a protrusion in each narrow channel section into a following wide channel section. The turbulent flow thus created promotes the mixing of the beverage and the $CO_2$ gas to provide a satisfying result. Accordingly, the above-mentioned object is achieved. Such a mixing device may be compact and thus, space efficient. Further, such a mixing device is uncomplicated in its design and therefore, easily produced.

According to a further aspect, the object is achieved by a carbonator for mixing a non-carbonated beverage with $CO_2$ gas for producing carbonated beverage. The carbonator comprises a mixing device according to at least one aspect or embodiment disclosed herein and a $CO_2$ inlet arrangement for admitting the $CO_2$ gas into the beverage. The $CO_2$ inlet arrangement comprises an admixing passage and a $CO_2$ inlet nozzle. The admixing passage is connected to a beverage source and to the inlet of the mixing channel. The $CO_2$ inlet nozzle is connected to the admixing passage such that in use the beverage and the $CO_2$ gas are mixed in two steps, a first mixing step in the admixing passage and a second mixing step in the mixing channel.

The above-mentioned characteristics of the mixing channel in combination with the arrangement for mixing in two steps, provides a carbonator which in use achieves a good mixing of beverage with $CO_2$ gas. Thus, the above-mentioned object is achieved.

According to an aspect, the object is further achieved by an appliance comprising a carbonator according to at least one aspect or embodiment disclosed herein. In such an appliance carbonated beverage may be provided for instance from a beverage dispensing outlet provided in the appliance.

According to an aspect, the object is achieved by a method of producing a carbonated beverage in a carbonator by mixing a non-carbonated beverage with $CO_2$ gas. The carbonator comprises a mixing device according to at least one aspect or embodiment disclosed herein and a $CO_2$ inlet arrangement connected to the inlet of the mixing channel. The $CO_2$ inlet arrangement comprises an admixing passage and a $CO_2$ inlet nozzle connected to the admixing passage. The method comprises:

admitting a flow of beverage into the admixing passage, admitting a flow of $CO_2$ gas into to the admixing passage via the $CO_2$ inlet nozzle to continuously admix the $CO_2$ gas with the beverage in a first mixing step, and further mixing the beverage with the $CO_2$ gas in a second mixing step in the mixing channel as the beverage and the $CO_2$ gas flow through the mixing channel to the outlet for carbonated beverage from the mixing channel.

The above-mentioned characteristics of the mixing passage in combination with the carbonator adapted to mix beverage and $CO_2$ gas in two steps, provides for a method which achieves a good mixing of beverage with $CO_2$ gas. Thus, the above-mentioned object is achieved.

The carbonator may be an in-line carbonator. In use beverage and $CO_2$ gas flow through the mixing channel in a turbulent flow of beverage along the main direction. The beverage and the $CO_2$ gas are mixed to produce a carbonated beverage. For instance, the beverage may be water or flavoured water. The $CO_2$ gas may be admitted into the beverage prior to the inlet of the mixing channel or at the beginning of the mixing channel. The carbonator may be arranged in a home, commercial, or public appliance, e.g. refrigerators, beverage centres, vending machines, etc. The carbonator and the method may as well be implemented as a separate product. Such a separate product could be installed in connection with e.g. a kitchen sink unit.

The elongated cross section, perpendicularly to the main direction of the mixing channel, extends in a first direction and in a second direction. The first and second directions are substantially perpendicular to the main direction and to each other. The elongated cross section of the mixing channel extends a first distance in a first direction and a second distance in a second direction, the first direction extending between the first and second delimiting surfaces. The elongated cross section is formed by the mixing channel being wider in the second direction than in the first direction. The elongated cross section may have substantially an even width in the second direction along the main direction of the mixing channel. In the first direction the width of the mixing channel varies along the main direction. That is, in the wide channel sections the first distance is longer than in the narrow channel sections. The protrusions extending along the first delimiting surface in a direction across the mixing channel have at least one directional component extending in the second direction. The protrusions may extend substantially in the second direction. The protrusions protrude with at least one directional component extending in the first direction. The protrusions may protrude substantially in the first direction. The main direction may change along the mixing channel, e.g. the mixing channel may be folded in which case the main direction changes substantially 180 degrees.

In the carbonator a turbulent flow of beverage is achieved to provide a good mixing of beverage and $CO_2$ gas to make the $CO_2$ gas dissolve in the beverage. In the admixing passage turbulent flow of beverage occurs mainly due to injection of the $CO_2$ gas into the beverage. In the mixing channel, turbulent flow of beverage is caused by the narrow and wide channel sections.

According to some embodiments the narrow channel sections may be 0.1-1.0 mm wide between one of the protrusions and the second delimiting surface. In this manner the narrow channel sections may be sufficiently narrow to induce turbulence in the flow of beverage.

According to some embodiments the mixing channel may have a length in the main direction of between 5-40 cm. In this manner a sufficient length of the mixing channel allowing proper mixing and a suitable pressure drop along the mixing channel is provided.

According to some embodiments the elongated cross section may be curved. For instance, the elongated cross section may be formed between an inner surface of a tube and core portion extending in the tube. The elongated cross section thus may be e.g. ring-shaped. In these embodiments the second direction is curved.

According to some embodiments the mixing device may comprise a tube and a core and the mixing channel may be formed between the tube and the core. In this manner an easily produced and compact mixing device may be achieved. The first and second delimiting surfaces may in these embodiments be formed by an outer surface of the core and an inner surface of the tube. The outer surface and/or the inner surface may be provided with the protrusions.

According to some embodiments the protrusions of the first delimiting surface may protrude between 0.5-8.0 mm into the mixing channel to form the wide channel sections between the protrusions, which wide channel sections extend between 0.6-9.0 mm between the first delimiting surface and the second delimiting surface. In this manner wide channel sections of sufficient width between two narrow channel sections to promote turbulent flow of beverage in the mixing channel are provided.

According to some embodiments at least one of the protrusions of the first delimiting surface may extend along the first delimiting surface across the entire mixing channel.

According to some embodiments the first delimiting surface and/or the second delimiting surface may be provided with at least 15 protrusions extending at least partially along the first delimiting surface and/or the second delimiting surface in a direction across the mixing channel to form at least 15 corresponding narrow channel sections of the mixing channel.

According to some embodiments the nozzle may have a minimum diameter of 0.2-0.4 mm. An advantage with the use of a nozzle having these dimensions is that regulatory $CO_2$ gas pressure levels used in carbonators, commonly <10 bar, will achieve both an injection velocity of $CO_2$ gas into the beverage to provide an adequate first mixing step as well as a suitable amount of $CO_2$ gas for carbonation of the beverage at beverage flow rates suitable for dispensing beverage into a drinking-glass, such as at a beverage flow rate of 0.5-3 liters/minute, or 1-2 liters/minute. Thus, the diameter of the nozzle is such that the $CO_2$ gas flow entering into the beverage will have a predetermined value.

According to some embodiments the carbonator may comprise a beverage cooler, wherein the beverage cooler is connected to the admixing passage. In this manner, if required, the beverage may be cooled to dissolve sufficient $CO_2$ gas and to provide a cooled carbonated beverage.

According to some embodiments the beverage cooler may comprise a flow passage or a container arranged in connection with a cooled compartment.

According to some embodiments the carbonator may comprise a beverage pump being connected to the admixing passage. In this manner the beverage pressure may be raised to a suitable level under operating conditions of the carbonator which so require.

According to some embodiments the $CO_2$ gas may be admitted into the admixing passage substantially at sonic velocity. In this manner a particularly good first mixing step may be achieved.

According to some embodiments the admixing passage may be subjected to a beverage pressure of 1.5-9 bar.

According to some embodiments the mixing channel may be flowed through with beverage at a flow rate of 0.5-3 liters/minute.

According to some embodiments the beverage may be cooled prior to being admitted into the admixing passage.

Further features of, and advantages with, the present invention will become apparent when studying the appended claims and the following detailed description. Those skilled in the art will realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully with reference to the accompanying drawings, in which example embodiments are shown. However, this invention should not be construed as limited to the embodiments set forth herein. Like numbers refer to like elements throughout. Well-known functions or constructions will not necessarily be described in detail for brevity and/or clarity.

Figure 1:
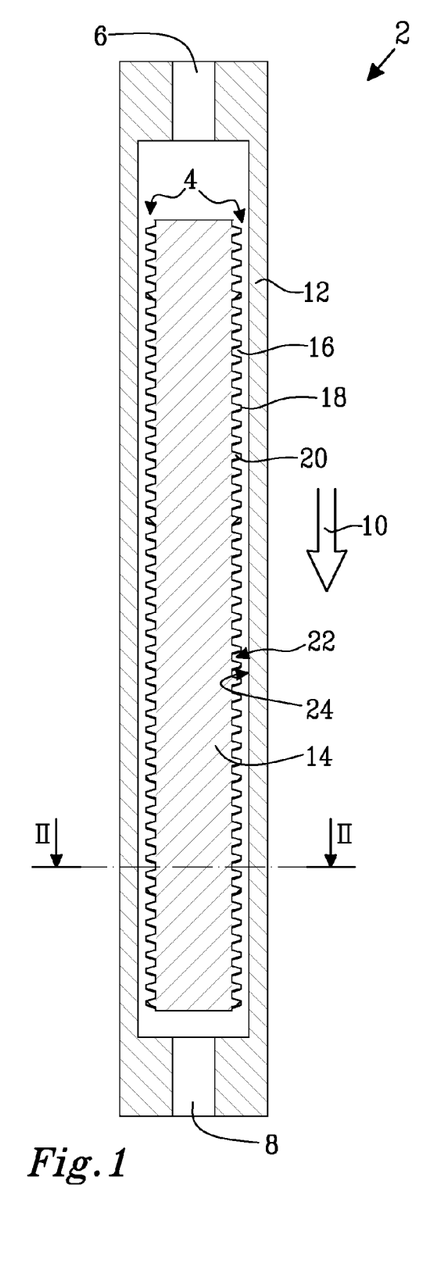
FIGS. 1 and 2 illustrate cross sections of a mixing device according to embodiments.
Figure 2:
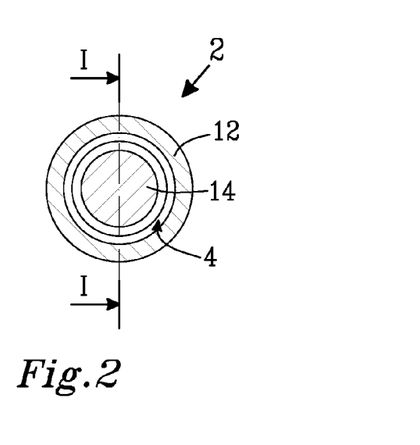

FIGS. 1 and 2 illustrate cross sections of a mixing device 2 according to embodiments. The respective cross sections of FIGS. 1 and 2 are indicated by arrows I-I and II-II in FIGS. 2 and 1. In the mixing device 2 a beverage and $CO^2$ gas are mixed to produce a carbonated beverage. The mixing device 2 comprises a mixing channel 4. An inlet 6 to the mixing channel 4 leads the beverage to the mixing channel 4. An outlet 8 from the mixing channel 4 leads the carbonated beverage from the mixing channel 4. The mixing channel 4 extends in a main direction 10 and is formed between a tube 12 and a core portion 14 extending in the tube 12. Accordingly, the mixing channel 4 has an elongated cross section, which is curved such that the elongated cross section is substantially ring-shaped, seen perpendicularly to the main direction 10 as illustrated in FIG. 2. In use, the beverage is adapted to flow through the elongated cross section of the mixing channel 4 along the main direction 10.

The mixing channel 4 comprises wide channel sections 16 and narrow channel sections 18 along the main direction 10. The narrow channel sections 18 are formed by protrusions 20 provided on an outer surface on the core portion 14. The outer surface of the core portion 14 forms a first delimiting surface 22 of the mixing channel 4. The protrusions 20 extend in a direction across the mixing channel 4 seen along the main direction 10. Further, the protrusions 20 protrude towards the inner surface of the tube 12. The inner surface of the tube forms a second delimiting surface 24 of the mixing channel 4. The wide channel sections 16 are formed between the outer surface of the core portion 14 in the interspaces between the protrusions 20 and the inner surface of the tube 12.

The inner diameter of the tube 12 e.g. may be between 10-30 mm, for instance around 20 mm. The mixing channel 4 may have a length in the main direction of between 5-40 cm, for instance between 12-25 cm. The narrow channel sections 18 may be 0.1-1.0 mm wide between one of the protrusions 20 and the second delimiting surface 24. Thus the mixing channel 4 may be adapted in use to be flowed through by beverage at a flow rate of 0.5-3 liters/minute, alternatively at a flow rate of 1-2 liters/minute. The protrusions 20 of the first delimiting surface 22 may protrude between 0.5-8.0 mm into the mixing channel 4 to form the wide channel sections 16 between the protrusions 20. The wide channel sections 16 may extend between 0.6-9.0 mm between the first delimiting surface 22 and the second delimiting surface 24.

The protrusions 20 e.g. may comprise discrete ring-shaped portions arranged along the core portion 14 seen in the main direction 10. Alternatively, the protrusions 20 e.g. may comprise a helical ridge extending along the core portion 14. Even though such a helical ridge could be seen as one element, it will form several protrusions 20 along the main direction 10 in the mixing channel 4. Accordingly, also in a mixing device 2 comprising a core with a helical ridge, the beverage will pass several protrusions. A further alternative to achieve protrusions in the mixing channel may be to form protrusions on the inner surface of the tube, e.g. by cutting threads in the tube. In this case the core portion may be provided with an even outer surface. According to the definitions above and in the claims, the inner surface of the tube will in this case be the first delimiting surface and the outer surface of the core portion will be the second delimiting surface.

Figure 3:
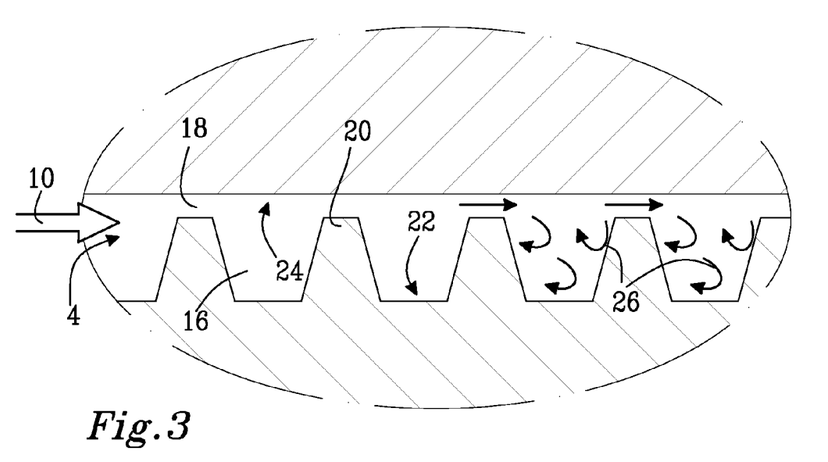
FIG. 3 illustrates a cross section of a portion of a mixing channel according to embodiments.

FIG. 3 illustrates a cross section of a portion of a mixing channel 4 according to embodiments. The mixing channel 4 is formed between a first delimiting surface 22 and a second delimiting surface 24. The first delimiting surface 22 is provided with protrusions 20 such that narrow channel sections 18 are formed in the mixing channel 4. Between the protrusions 20 wide channel sections 16 are formed.

A beverage and $CO^2$ gas flow through the mixing channel in a main direction 10. Thanks to the narrow and wide channel sections 18, 16 a turbulent flow is promoted in the beverage as it flows through mixing channel 4, the beverage being subjected to repeated induction of turbulence, indicated by arrows 26. It is thus ensured that the mixing of the beverage and the $CO^2$ gas takes place continuously along the mixing channel 4. Optimal conditions for dissolving the $CO_2$ gas in the beverage are created and a well carbonated beverage may be produced in the mixing channel 4 according to embodiments. The beverage is subjected to a pressure drop as it flows through the mixing channel 4. In particular, for every narrow channel section 18 the beverage passes it is subjected to a partial pressure drop in the mixing channel 4.

Figure 4:
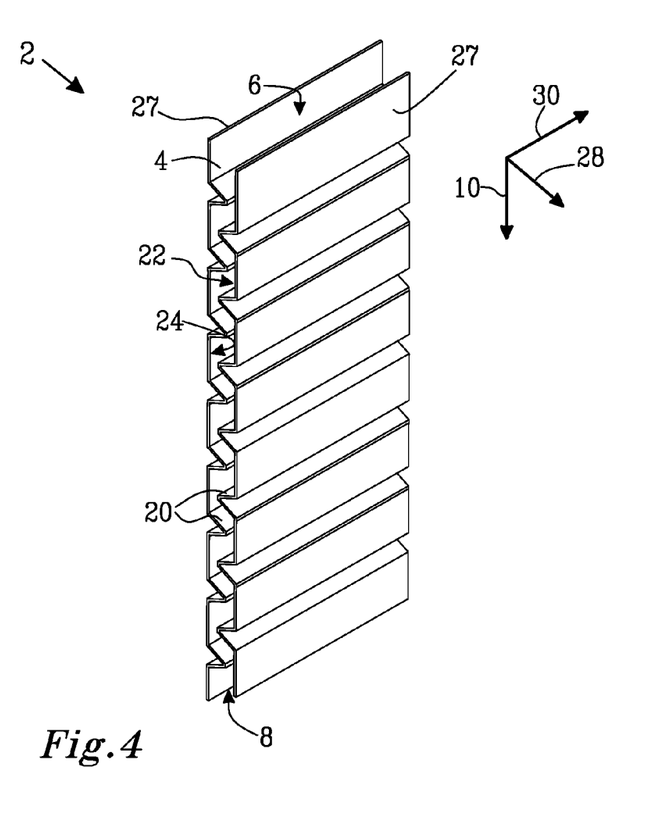
FIG. 4 illustrates a mixing device for mixing beverage with $CO^2$ gas according to embodiments.

FIG. 4 illustrates a mixing device 2 for mixing beverage with $CO^2$ gas according to embodiments. The mixing device 2 comprises a mixing channel 4 formed between two plates 27. The mixing device 2 has an inlet 6 to the mixing channel 4 and an outlet 8 from the mixing channel 4. The mixing channel 4 extends in a main direction 10 and is formed between a first delimiting surface 22 and a second delimiting surface 24. A first direction 28 and a perpendicular second direction 30 extend perpendicularly to the main direction 10. The first and second delimiting surfaces 22, 24 are arranged substantially in parallel with a plane extending in the main direction 10 and the second direction 30

The mixing channel 2 has an elongated cross section. The elongated cross section is perpendicularly to the main direction 10 and extends in plane parallel with the first direction 28 and the second direction 30. The elongated cross section extends a first distance in the first direction 28 and a second distance in the second direction 30. The elongated cross section is formed by the mixing channel 4 being wider in the second direction 30 than in the first direction 28.

In FIG. 4 the mixing channel 4 is illustrated without a side portion to show the cross section along the main direction 10. The plates 27 and accordingly, the first and second delimiting surfaces 22, 24 are provided with protrusions 20. Thus, the first distance varies along the main direction 10 of the mixing channel 4. The protrusions 20 form narrow channel sections and wide channel sections therebetween. Thus the beverage is subjected to a turbulent flow as it flows through the mixing channel 4 to dissolve the $CO^2$ gas in the beverage to produce a carbonated beverage.

The narrow channel sections may be 0.1-1.0 mm wide between one of the protrusions 20 and the first or second delimiting surface 22, 24. The protrusions 20 of the first and second delimiting surfaces 22, 24 may protrude between 0.5-8.0 mm into the mixing channel 4 to form the wide channel sections between the protrusions 20. The wide channel sections may extend between 0.6-9.0 mm between the first delimiting surface 22 and the second delimiting surface 24. At least one of the protrusions 20 of the first and second delimiting surfaces 22, 24 extends along the first and second delimiting surfaces 22, 24 across the entire mixing channel 4. The first delimiting surface 22 and the second delimiting surface 24 are provided with at least 15 protrusions extending at least partially along the first delimiting surface 22 and the second delimiting surface 24 in a direction across the mixing channel 4, e.g. substantially in the second direction to form at least 15 corresponding narrow channel sections of the mixing channel 4.

Figure 5:
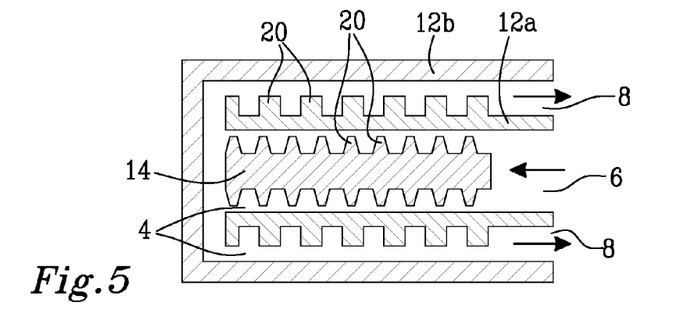
FIG. 5 illustrates a mixing device for mixing a beverage with $CO^2$ gas according to embodiments.

FIG. 5 illustrates a mixing device 2 for mixing a beverage with $CO^2$ gas according to embodiments. The mixing device 2 comprises a mixing channel 4 which is folded, i.e. the main direction of the mixing channel changes 180 degrees. In a first portion of the mixing channel 4, the mixing channel 4 is formed between a tube 12a and a core portion 14. A surface of the core portion 14 is provided with protrusions 20 to form narrow channel sections in the first portion of the mixing channel 4. The beverage flows from an inlet 6 along a first course in the first portion of the mixing channel 4. In a second portion of the mixing channel 4 the mixing channel 4 is formed between a second tube 12b and the first tube 12a.

A surface of the first tube 12a is provided with protrusions 20 to form narrow channel sections in the second portion of the mixing channel 4. The beverage flows along a second course in the second portion of the mixing channel 4 to an outlet 8, in a direction opposite to the first course. The first and second portions of the mixing channel 4 may be between 2.5-20 cm long.

Figure 6:
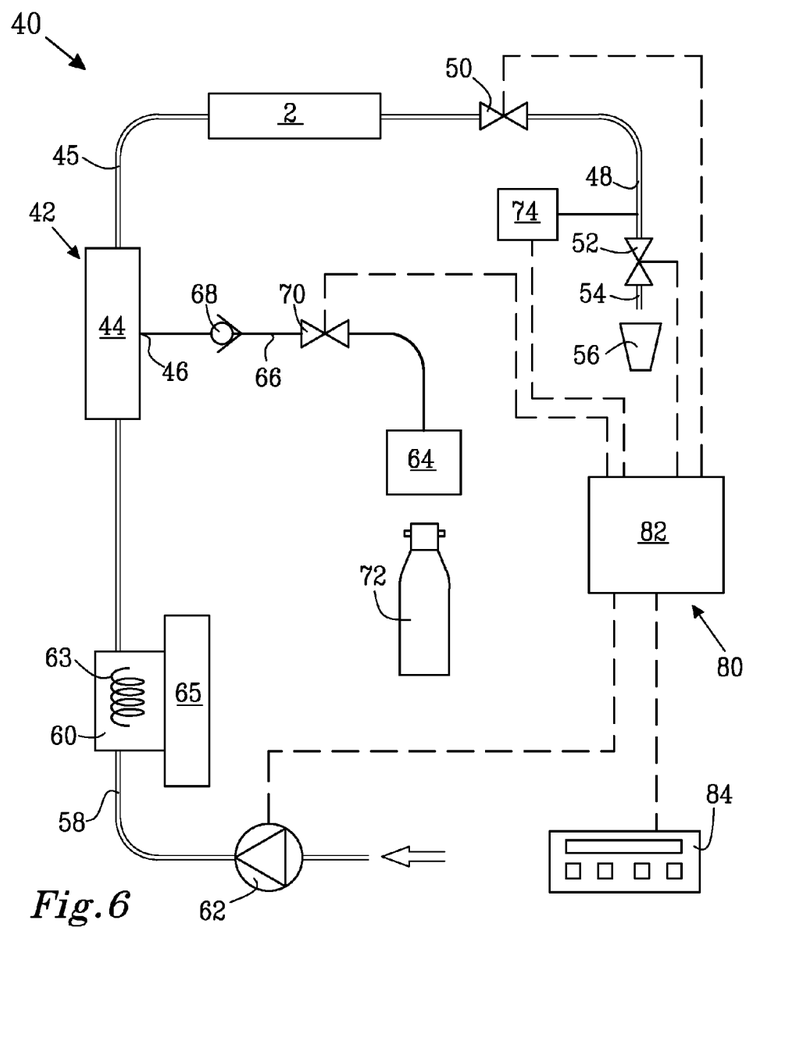
FIG. 6 illustrates a carbonator for mixing a non-carbonated beverage with $CO^2$ gas for producing carbonated beverage according to embodiments.

FIG. 6 illustrates a carbonator 40 for mixing a non-carbonated beverage with $CO^2$ gas for producing carbonated beverage according to embodiments. The carbonator 40 comprises a mixing device 2 according to aspects or embodiments described herein. The carbonator 40 further comprises a $CO^2$ inlet arrangement 42 for admitting the $CO^2$ gas into the beverage. The $CO^2$ inlet arrangement 42 comprises an admixing passage 44 and a $CO^2$ inlet nozzle 46. The admixing passage 44 is connected to a beverage source via a beverage conduit 58 and an inlet of a mixing channel of the mixing device 2, and wherein the $CO^2$ inlet nozzle 46 is connected to the admixing passage 44. The beverage and the $CO^2$ gas are mixed in two steps, a first mixing step in the admixing passage 44 and a second mixing step in the mixing channel.

Since the carbonator 40 provides for $CO_2$ gas to be admitted into the beverage in the admixing passage 44 via the nozzle 46, a turbulent flow of beverage and $CO_2$ gas is achieved in the admixing passage 44. The turbulent flow in the admixing passage 44 promotes the mixing and dissolving of the $CO_2$ gas in the beverage in the first mixing step. Since the carbonator 40 further provides for the beverage and the $CO_2$ gas to be subjected to a second mixing step in the mixing device 2 comprising a mixing channel, it is ensured that a thorough mixing and dissolving of the $CO_2$ gas in the beverage is achieved to produce a carbonated beverage.

In the carbonator 40a connecting conduit 45 is provided between the admixing passage 44 and the mixing device 2 and an outlet conduit 48 connected to the outlet of the mixing channel of the mixing device 2. The connecting conduit 45 may be short, e.g. only 1 or a few millimeters, but may alternatively be longer. The outlet conduit 48 may be adapted to provide a pressure drop of about 1 bar in the carbonated beverage flowing from the mixing device 2. A different pressure drop, e.g. 2-3 bar may alternatively be provided in the outlet conduit 48. In this manner $CO_2$ gas may form bubbles in the outlet conduit to provide an appealingly sparkling carbonated beverage. The outlet conduit 48 may comprise a first flow control valve 50. The first flow control valve 50 may be set to provide a suitable pressure drop in the carbonated beverage. For instance, the first flow control valve 50 may be set to assist in providing a suitable pressure drop in the outlet conduit 48, e.g. the above-mentioned pressure drop of about 1 bar or 2-3 bar. In this context it may be mentioned that the beverage is also subject to pressure drops in other parts of the carbonator 40, e.g. in the mixing device 2, the connecting conduit 45 or the outlet conduit 48. Further, a second flow control valve 52 may be provided in the outlet conduit 48. The second flow control valve 52 may be a shut-off valve. The second flow control valve 52 is opened when carbonated beverage is dispensed from an outlet 54 of the outlet conduit 48 into e.g. a glass 56. The second flow control valve 52 may be an adjustable double cone tap for adjusting the flow rate of the carbonated beverage and providing a smooth flow.

The carbonator 40 is an in-line carbonator. The beverage is lead to the admixing passage 44 via a beverage conduit 58. In the beverage conduit 58 there may be provided the beverage cooler 60. Accordingly, in the carbonator 40 the beverage cooler 60 may be connected to the admixing passage 44. In this manner the beverage may be cooled prior to being admitted into the admixing passage. Since cold water dissolves $CO_2$ gas better than warm water it may be ensured that cold water/beverage reaches the admixing passage 44 and the mixing device 2 in operation situations where comparatively warm water is admitted into the carbonator 40. Further, a beverage pump 62 may be connected to the admixing passage 44. The beverage pump 62 may be provided in the beverage conduit 58. In operation situations where a beverage pressure does not suffice for proper operation of the carbonator 40, the beverage pump 62 may provide such sufficient beverage pressure. Whether provided by the beverage pump 62, or by water main pressure, the admixing passage 44 suitably may be subjected to a beverage pressure of 1.5-9 bar. The mixing channel of the mixing device 2 may be adapted to be flowed through by beverage at a flow rate of 0.5-3 liters/minute.

The beverage cooler 60 may comprise a flow passage 63 or a container arranged in connection with a cooled compartment 65 (schematically indicated in FIG. 6). The cooled compartment 65 may be comprised in a refrigerator. Thus the cooling of the cooled compartment 65 of the refrigerator may be utilized for cooling the beverage in the flow passage 63 or container.

The $CO_2$ inlet nozzle 46 may have a minimum diameter of 0.1-0.9 mm, for instance the diameter of the nozzle 46 may be 0.2-0.4 mm. In this manner, as long as the $CO_2$ gas pressure, e.g. commonly used 6-10 bar, is above the beverage pressure, the $CO_2$ gas will be admitted into the beverage at a suitable rate. The nozzle 46 may be adapted to permit the $CO^2$ gas to enter the admixing passage 44 at sonic velocity when the $CO_2$ gas pressure is 1,832 times the beverage pressure in the admixing passage 44. This promotes a particularly good first mixing step. Also $CO_2$ gas admitted at lower velocity than sonic velocity into the admixing passage 44 may provide a sufficient first mixing step.

The carbonator 40 comprises a pressure vessel connector 64 and a $CO_2$ conduit leading 66 from the pressure vessel connector 64 to the $CO_2$ inlet nozzle 46. A check valve 68 may be provided in the $CO_2$ conduit 66. A third flow control valve 70 may be arranged in the $CO_2$ conduit 66. A $CO_2$ gas bottle 72 may be connected to the carbonator 40 by means of the pressure vessel connector 64. The check valve 68 may ensure that the beverage does not reach the pressure vessel connector 64 if the pressure in the $CO_2$ conduit 66 is below the beverage pressure, e.g. when a $CO_2$ pressure vessel is being exchanged. The third flow control valve 70 may be a shut-off valve and may be used for opening and closing the $CO_2$ conduit 66.

The carbonator 40 may further comprise a flavouring arrangement 74 connected e.g. to the outlet conduit 48. In this manner the carbonator 40 may be set up to carbonate water, e.g. from a water main, and thus, to provide carbonated beverage in the form of carbonated water at the outlet 54 of the outlet conduit 48. Further, a carbonated beverage such as a soft drink or vitamin or mineral water may be provided at the outlet 54 of the outlet conduit 48 by the carbonator 40 when a flavour concentrate and/or vitamin/mineral concentrate is added to water in the outlet conduit 48 from the flavouring arrangement 74.

According to embodiments the carbonator 40 may comprise a control system 80. The control system 80 may be connected to, and comprise, one or more of the components of the carbonator 40 as discussed below. The control system 80 comprises a controller 82, which may include a micro processor and a memory. The controller 82 is connected to a control panel 84 which may be operated by a user to dispense carbonated beverage from outlet 54 of the carbonator 40. In its simplest form the operation of the carbonator 40 only provides an on/off function, which in such case is operated by a user via the control panel 84. However, in a more advanced carbonator 40 the user is provided with options of selecting carbonation level of the beverage, temperature of the beverage, and kind of beverage via the control panel 84.

The first flow control valve 50 may be controlled to set a pressure drop between the outlet conduit 48 and the ambient pressure around the carbonator 40 to provide a desired carbonation level of the beverage. The second flow control valve 52 and the third flow control valve 70 in the form of shut-off-valves may be adapted to be controlled substantially simultaneously. Thus, when a user via the control panel 84 desires to dispense carbonated beverage, the second flow control valve 52 and the third flow control valve 70 are opened and when dispensing is to stop the second flow control valve 52 and the third flow control valve 70 are closed. The valves 52, 70 adapted to be controlled substantially simultaneously encompasses there being a short time delay between the valves 52, 70 opening or closing, e.g. to allow a pressure build-up in the beverage before dispensing commences. If a beverage pump 62 is utilized in the carbonator 40, the beverage pump 62 is switched on at least when dispensing beverage. If carbonated beverage in the form of a soft drink is to be dispensed the flavouring arrangement 74 is activated by the controller 82. For this purpose the flavouring arrangement 74 may comprise a pump and/or a valve.

Figure 7:
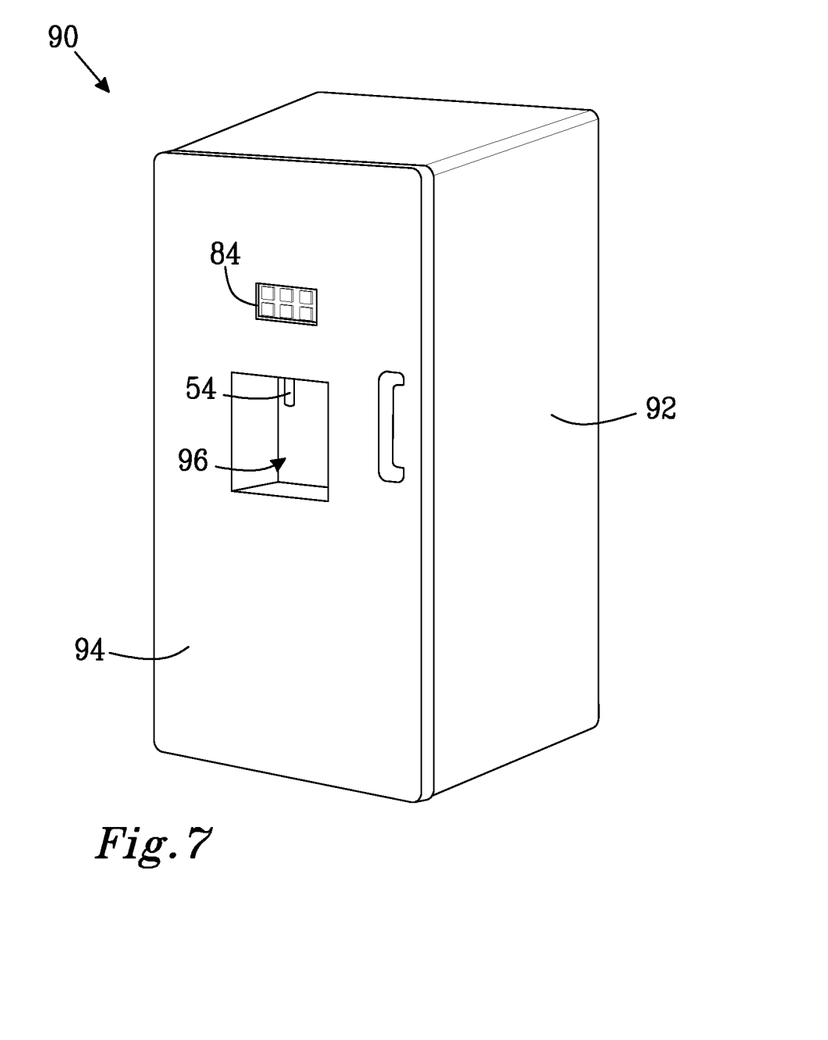
FIG. 7 illustrates an appliance according to embodiments comprising a carbonator.

FIG. 7 illustrates an appliance 90 according to embodiments comprising a carbonator. The appliance 90 is a refrigerator 92. The refrigerator 92 comprises a cooled compartment, which may be cooled to an above freezing point temperature, e.g. 5 degrees Celsius. Alternatively or in addition, the refrigerator 92 may comprise a cooled compartment, which may be cooled to a below freezing point temperature. A door 94 is provided with a recess 96 for placing a glass therein. An outlet 54 for carbonated beverage of the carbonator is arranged in the recess 96. A control panel 84 of a control system of the carbonator is provided on the door 94. A user may dispense carbonated beverage into a glass from the outlet 54 by means of manipulating the control panel 84.

Figure 8:
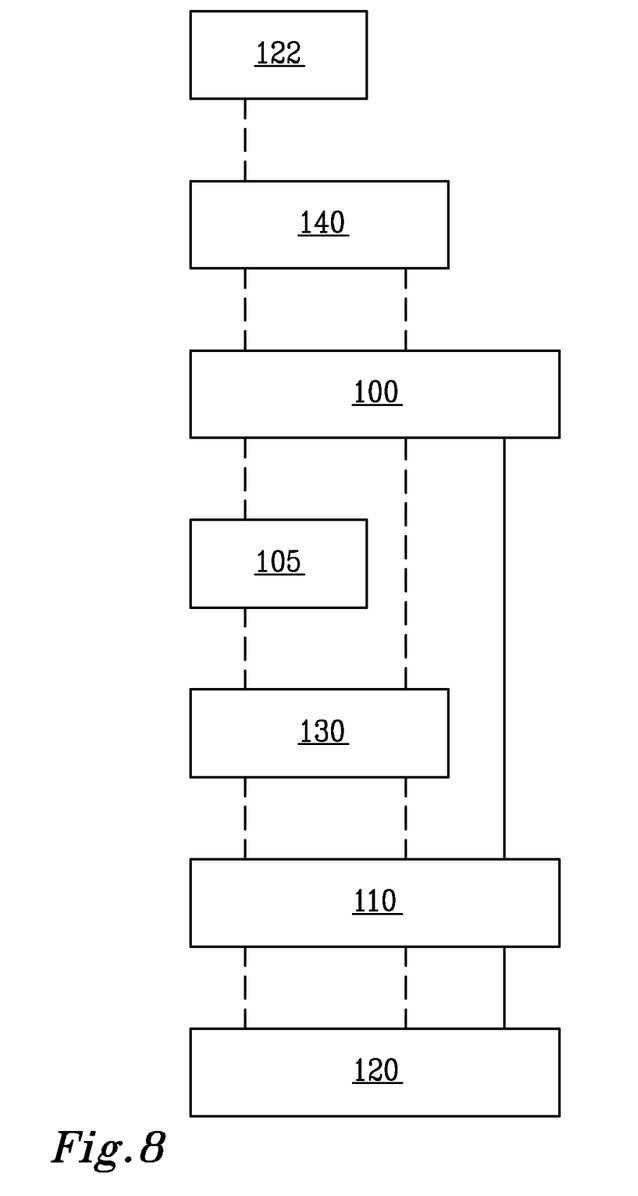
FIG. 8 illustrates a method of producing a carbonated beverage in a carbonator.

FIG. 8 illustrates a method of producing a carbonated beverage in a carbonator by mixing a non-carbonated beverage with $CO^2$ gas. The carbonator comprising a mixing device according to aspects and embodiments disclosed herein and a $CO^2$ inlet arrangement connected to an inlet of a mixing channel of the mixing device. The $CO^2$ inlet arrangement comprises an admixing passage and a $CO^2$ gas inlet nozzle connected to the admixing passage. The method comprises:

admitting 100 a flow of beverage into the admixing passage,
admitting 110 a flow of $CO^2$ gas into to the admixing passage via the $CO^2$ gas inlet nozzle to continuously admix the $CO^2$ gas with the beverage in a first mixing step, and further mixing 120 the beverage with the $CO^2$ gas in a second mixing step in the mixing channel as the beverage and the $CO^2$ gas flow through the mixing channel to the outlet for carbonated beverage from the mixing channel.

The admitting 110 a flow of $CO^2$ gas may comprise:
admitting 105 the $CO^2$ gas into the admixing passage substantially at sonic velocity.

The method may further comprise:
subjecting 122 the admixing passage to a beverage pressure of 1.5-9 bar.

The method may further comprise:
flowing 130 through the mixing channel with beverage at a flow rate of 0.5-3 liters/minute.

The method may further comprise:
cooling 140 the beverage prior to being admitted into the admixing passage.

Example embodiments described above may be combined as understood by a person skilled in the art. It is also understood by those skilled in the art that the expressions—protrusion formed in a surface, protrusion formed on a surface, protrusion provided on a surface, and a surface provided with protrusions—are intended to have the same meaning herein. Furthermore, the surface of a protrusion itself is intended to form part of the surface from which it protrudes. The core portions 14 of the mixing device 2 of embodiments illustrated in FIGS. 1, 2, and 5 may be fixed in a relevant tube or the core portions 14 may be freely positioned in the relevant tube.

A protrusion extending in a direction across the mixing channel is to be understood to cover not only protrusions, which extend perpendicularly to the main direction across the mixing channel but also a protrusion which extends across the mixing channel at a different angle than perpendicularly to the main direction.

Although the invention has been described with reference to example embodiments, many different alterations, modifications and the like will become apparent for those skilled in the art. For instance, the $CO_2$ gas may be admitted into the beverage in the mixing channel of the mixing device.

As used herein, the term "comprising" or "comprises" is open-ended, and includes one or more stated features, elements, steps, components or functions but does not preclude the presence or addition of one or more other features, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A mixing device (2) for a beverage and $CO_2$ gas for producing carbonated beverage, the mixing device (2) comprising a mixing channel (4), an inlet (6) to the mixing channel (4) and an outlet (8) for carbonated beverage from the mixing channel (4), wherein the mixing channel (4) extends in a main direction (10), along which main direction (10) the beverage is adapted to flow, wherein the mixing channel (4) comprises first channel sections (16) and second channel sections (18) along the main direction (10), characterized in that the mixing channel (4) has an elongated cross section seen in a direction perpendicular to the main direction (10), wherein at least a continuous first delimiting surface (22) of the mixing channel (4) is provided with at least two protrusions (20) extending at least partially along the first delimiting surface (22) in a first direction across the mixing channel (4) and protruding towards a second delimiting surface (24) of the mixing channel (4) to form the second channel sections (18), wherein cross sections of the first delimiting surface (22) taken perpendicular to the main direction at the first channel sections (16) and at the second channel sections (18) are circular, wherein the second channel sections (18) are narrower than the first channel sections (16), wherein the first delimiting surface (22) and the protrusions (20) are separated from the second delimiting surface (24), and wherein cross sections of first channel sections (16) taken perpendicular to the main direction (10) are ring shaped and cross sections of the second channel section (18) taken perpendicular to the main direction (10) are ring shaped.

2. The mixing device (2) according to claim 1, wherein the second channel sections (18) are 0.1-1.0 mm wide between one of the protrusions (20) and the second delimiting surface (24).

3. The mixing device (2) according to claim 1, wherein the mixing channel (4) has a length in the main direction (10) of between 5-40 cm.

4. The mixing device (2) according to claim 1, wherein the elongated cross section is curved.

5. The mixing channel according to claim 4, wherein the mixing device (2) comprises a tube (12) and a core (14), and wherein the mixing channel (4) is formed between the tube (12) and the core (14).

6. The mixing device (2) according to claim 1, wherein the protrusions (20) of the first delimiting surface (22) protrude between 0.5-8.0 mm into the mixing channel (4) to form the first channel sections (16) between the protrusions (20), which first channel sections (16) extend between 0.6-9.0 mm between the first delimiting surface (22) and the second delimiting surface (24).

7. The mixing device (2) according to claim 1, wherein at least one of the protrusions (20) of the first delimiting surface (22) extends along the first delimiting surface (22) in a second direction perpendicular to the first direction across the entire first delimiting surface (22) located in the mixing channel (4).

8. The mixing device (2) according to claim 1, wherein the first delimiting surface (22) and the second delimiting surface (24) are provided with at least 15 protrusions (20) extending at least partially along the first delimiting surface (22) and the second delimiting surface (24) in a direction across the mixing channel (4) to form corresponding at least 15 second channel sections (18) of the mixing channel (4).

9. A carbonator (40) for mixing a non-carbonated beverage with $CO_2$ gas for producing carbonated beverage, the carbonator (40) comprising a mixing device (2) according to claim 1 and a $CO_2$ inlet arrangement (42) for admitting the $CO_2$ gas into the beverage, wherein the $CO_2$ inlet arrangement (42) comprises an admixing passage (44) and a $CO_2$ inlet nozzle (46), which admixing passage (44) is connected to a beverage source and the inlet of the mixing channel (4), and wherein the $CO_2$ inlet nozzle (46) is connected to the admixing passage (44) such that in use the beverage and the $CO_2$ gas are mixed in two steps, a first mixing step in the admixing passage (44) and a second mixing step in the mixing channel (4).

10. The carbonator (40) according to claim 9, wherein the nozzle (46) has a minimum diameter of area of 0.2-0.4 mm.

11. The carbonator (40) according to claim 9, wherein the carbonator (40) is adapted in use to permit the $CO_2$ gas to enter the admixing passage (44) substantially at sonic velocity.

12. The carbonator (40) according to claim 9, wherein the admixing passage (44) is adapted in use to be subject to a beverage pressure of 1.5-9 bar.

13. The carbonator (40) according to claim 9, wherein the mixing channel (4) is adapted in use to be flowed through by beverage at a flow rate of 0.5-3 liters/minute.

14. The carbonator (40) according to claim 9, further comprising an outlet conduit (48) connected to the outlet (8) of the mixing channel (4).

15. The carbonator (40) according to claim 14, wherein the outlet conduit (48) comprises a first flow control valve (50).

16. The carbonator (40) according to claim 15, wherein the outlet conduit (48) comprises a second flow control valve (52).

17. The carbonator (40) according to claim 9, further comprising a beverage cooler (60), wherein the beverage cooler (60) is connected to the admixing passage (44).

18. The carbonator (40) according to claim 17, wherein the beverage cooler (60) comprises a flow passage (63) or a container arranged in connection with a cooled compartment (65).

19. The carbonator (40) according to claim 9, further comprising a beverage pump (62) being connected to between the beverage source and the admixing passage (44).

20. The carbonator (40) according to claim 9, further comprising a pressure vessel connector (64) and a $CO_2$ conduit (66) leading from the pressure vessel connector (64) to the $CO_2$ inlet nozzle (46).

21. The carbonator (40) according to claim 20, further comprising a check valve (68) and a flow control valve (70) arranged in the $CO_2$ conduit (66).

22. The carbonator (40) according to claim 9, further comprising:
an outlet conduit (48) connected to the outlet (8) of the mixing channel (4), wherein the outlet conduit (48) comprises a first flow control valve (52);
a pressure vessel connector (64) and a $CO_2$ conduit (66) leading from the pressure vessel connector (64) to the $CO_2$ inlet nozzle (46); and
a check valve (68) and a second flow control valve (70) arranged in the $CO_2$ conduit (66), wherein the second flow control valve (52) and the third flow control valve (70) are shut-off-valves, which are adapted to be controlled substantially simultaneously.

23. An appliance (90) comprising a carbonator (40) according to claim 9.

24. A method of producing a carbonated beverage in a carbonator (40) by mixing a non-carbonated beverage with $CO_2$ gas, the carbonator (40) comprising a mixing device (2) according to claim 1 and a $CO_2$ inlet arrangement (42) connected to the inlet of the mixing channel (4), the $CO_2$ inlet arrangement (42) comprising an admixing passage (44) and a $CO_2$ inlet nozzle (46) connected to the admixing passage (44), wherein the method comprises:
admitting (100) a flow of beverage into the admixing passage (44),
admitting (110) a flow of $CO_2$ gas into to the admixing passage (44) via the $CO_2$ inlet nozzle (46) to continuously admix the $CO_2$ gas with the beverage in a first mixing step, and
further mixing (120) the beverage with the $CO_2$ gas in a second mixing step in the mixing channel (4) as the beverage and the $CO_2$ gas flow through the mixing channel (4) to the outlet for carbonated beverage from the mixing channel (4).

25. The method according to claim 24, comprising:
admitting (105) the $CO_2$ gas into the admixing passage (44) substantially at sonic velocity.

26. The method according to claim 24, comprising:
subjecting (122) the admixing passage (44) to a beverage pressure of 1.5-9 bar.

27. The method according to claim 24, comprising:
flowing (130) through the mixing channel (4) with beverage at a flow rate of 0.5-3 liters/minute.

28. The method according to claim 24, comprising:
cooling (140) the beverage prior to being admitted into the admixing passage (44).

29. A carbonator (40) for mixing a non-carbonated beverage with $CO_2$ gas for producing carbonated beverage, the carbonator (40) comprising a mixing device (2) for a beverage; $CO_2$ gas for producing carbonated beverage; and a $CO_2$ inlet arrangement (42) for admitting the $CO_2$ gas into the beverage,
wherein the mixing device (2) comprises a mixing channel (4), an inlet (6) to the mixing channel (4) and an outlet (8) for carbonated beverage from the mixing channel (4), wherein the mixing channel (4) extends in a main direction (10), along which main direction (10) the beverage is adapted to flow, wherein the mixing channel (4) comprises first channel sections (16) and second channel sections (18) along the main direction (10), characterized in that the mixing channel (4) has an elongated cross section seen in a direction perpendicular to the main direction (10), wherein at least a first delimiting surface (22) of the mixing channel (4) is provided with protrusions (20) extending at least partially along the first delimiting surface (22) in a first direction across the mixing channel (4) and protruding towards a second delimiting surface (24) of the mixing channel (4) to form the second channel sections (18), wherein cross sections of the first delimiting surface (22) taken perpendicular to the main direction at the first channel sections (16) and at the second channel sections (18) are circular, wherein the second channel sections (18) are narrower than the first channel sections (16), wherein the first delimiting surface (22) and the protrusions (20) are separated from the second delimiting surface (24), wherein cross sections of first channel sections (16) taken perpendicular to the main direction (10) are ring shaped and cross sections of the second channel section (18) taken perpendicular to the main direction (10) are ring shaped,
wherein the $CO_2$ inlet arrangement (42) comprises an admixing passage (44) and a $CO_2$ inlet nozzle (46), which admixing passage (44) is connected to a beverage source and the inlet of the mixing channel (4), wherein the $CO_2$ inlet nozzle (46) is connected to the admixing passage (44) such that in use the beverage and the $CO_2$ gas are mixed in two steps, a first mixing step in the admixing passage (44) and a second mixing step in the mixing channel (4), and wherein the admixing passage (44) is connected to the inlet (6) to the mixing channel (4).

\* \* \* \* \*

UNITED STATES PATENT AND TRADEMARK OFFICE
CERTIFICATE OF CORRECTION

PATENT NO. : 9,770,694 B2  
APPLICATION NO. : 14/354687  
DATED : September 26, 2017  
INVENTOR(S) : Andreas Psilander Page 1 of 1

It is certified that error appears in the above-identified patent and that said Letters Patent is hereby corrected as shown below:

In the Claims

Claim 19 found at Column 13, Line 28: please delete the word "to" after the word "connected"

Signed and Sealed this  
Fifteenth Day of May, 2018

Andrei Iancu  
*Director of the United States Patent and Trademark Office*